United States Patent [19]

Heung

[11] Patent Number: 5,298,196

[45] Date of Patent: Mar. 29, 1994

[54] METHOD AND APPARATUS FOR EXTRACTING TRITIUM AND PREPARING RADIOACTIVE WASTE FOR DISPOSAL

[75] Inventor: Leung K. Heung, Aiken, S.C.

[73] Assignee: The United States of America as represented by the United States Department of Energy, Washington, D.C.

[21] Appl. No.: 883,997

[22] Filed: May 18, 1992

[51] Int. Cl.[5] .............................................. G21F 9/12
[52] U.S. Cl. ................................. 252/633; 373/111; 373/122; 373/127; 976/DIG. 377; 976/DIG. 393; 376/260; 376/261; 422/159; 110/237; 110/255
[58] Field of Search ................ 252/631, 633, 626; 588/251; 373/111, 122, 127, 118, 129, 157; 976/DIG. 377, DIG. 393; 376/260, 261; 422/159; 110/235, 237, 255, 259

[56] References Cited

U.S. PATENT DOCUMENTS

| | | | |
|---|---|---|---|
| 3,037,922 | 5/1962 | Johnson | 204/154.2 |
| 3,079,317 | 2/1963 | Jenks et al. | 204/154.2 |
| 3,100,184 | 8/1963 | Abraham | 204/154.2 |
| 4,139,488 | 2/1979 | Knotik et al. | 252/626 |
| 4,532,102 | 7/1985 | Cawley | 376/185 |
| 4,562,037 | 12/1985 | Panayotou et al. | 376/340 |
| 4,663,111 | 5/1987 | Kim et al. | 376/185 |
| 4,676,175 | 6/1987 | Ledebrink et al. | 110/235 |
| 4,688,621 | 8/1987 | Darmara | 164/46 |
| 4,760,585 | 7/1988 | Queiser et al. | 373/122 |
| 4,768,430 | 9/1988 | Yamamoto et al. | 100/37 |
| 4,816,228 | 3/1989 | Yoshida et al. | 422/159 |
| 4,892,684 | 1/1990 | Harp | 252/626 |

Primary Examiner—Donald P. Walsh
Assistant Examiner—Ngoclan T. Mai
Attorney, Agent, or Firm—Brian R. Tumm; Harold M. Dixon; William R. Moser

[57] ABSTRACT

Apparatus for heating an object such as a nuclear target bundle to release and recover hydrogen and contain the disposable residue for disposal. The apparatus comprises an inverted furnace, a sleeve/crucible assembly for holding and enclosing the bundle, conveying equipment for placing the sleeve onto the crucible and loading the bundle into the sleeve/crucible, a lift for raising the enclosed bundle into the furnace, and hydrogen recovery equipment including a trap and strippers, all housed in a containment having negative internal pressure. The crucible/sleeve assembly has an internal volume that is sufficient to enclose and hold the bundle before heating; the crucible's internal volume is sufficient by itself to hold and enclose the bundle's volume after heating. The crucible can then be covered and disposed of; the sleeve, on the other hand, can be reused.

18 Claims, 3 Drawing Sheets

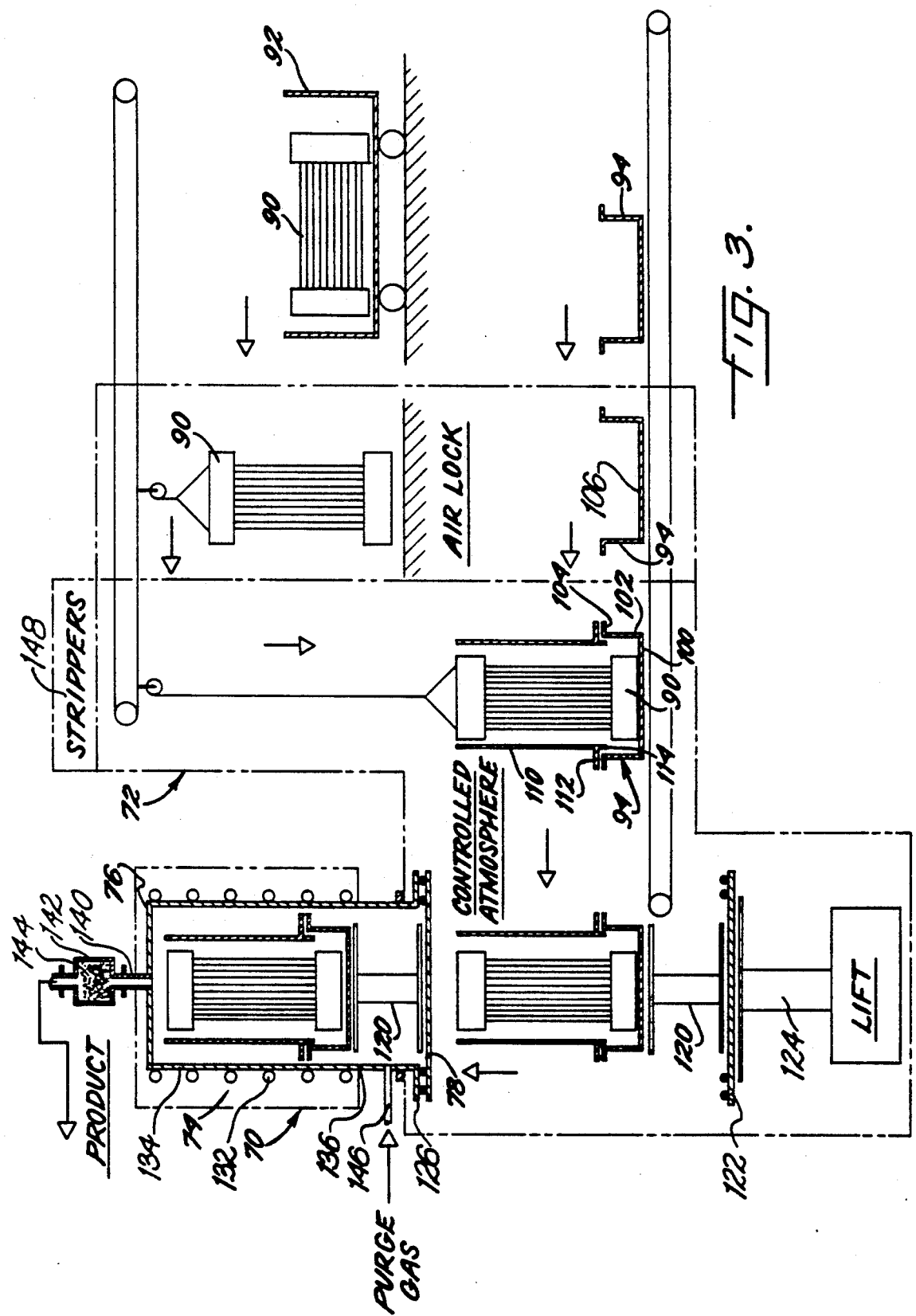

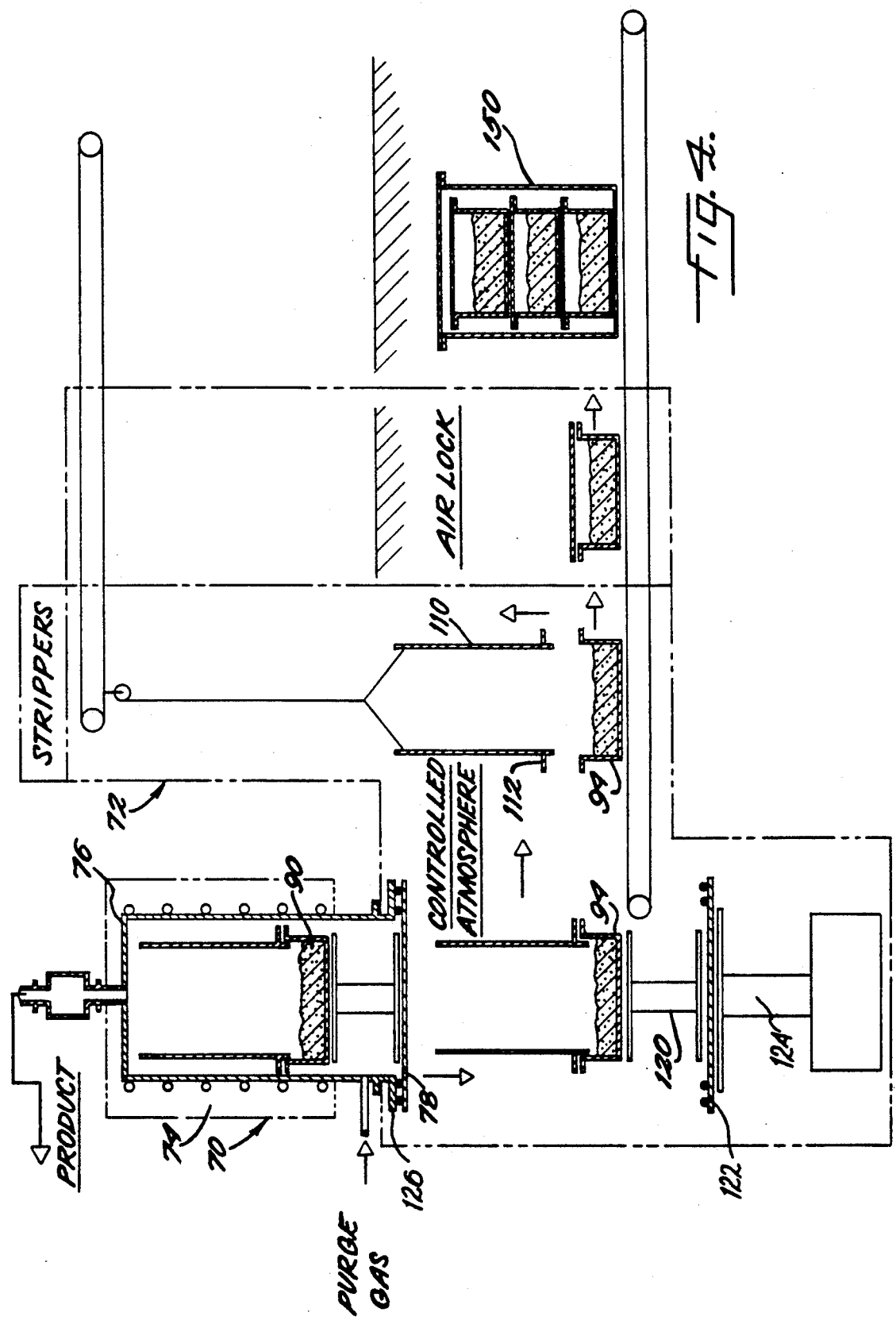

METHOD AND APPARATUS FOR EXTRACTING TRITIUM AND PREPARING RADIOACTIVE WASTE FOR DISPOSAL

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to the extraction of tritium and preparation of radioactive waste for disposal. More particularly, the present invention relates to tritium recovery during the process of heating and melting irradiated nuclear targets.

2. Discussion of Background

Tritium is a radioactive isotope of hydrogen. Because it is frequently found in the form of a diatomic gas or bound in a water molecule, it is relatively mobile and difficult to recover and contain once it has escaped into the environment. Preventing the escape of tritium is an important priority in the operation of facilities where tritium is created as a product or a by-product.

Tritium is created when lithium metal in target bundles is irradiated in a nuclear reactor. Nuclear reactor targets, after use, are referred to as "spent". Spent target bundles must be stored in carefully constructed disposal cells for a few hundred to thousands of years depending on the length of time the radioisotopes remain significantly radioactive and on government requirements. The volume required for long-term storage of radioactive waste should be minimized because of cost and other considerations.

Using heat to drive tritium from nuclear targets for recovery is well known. See for example both U.S. Pat. No. 4,532,102 and 3,100,184 issued to Cawley and Abrahams, respectively.

A prior art furnace, crucible and target bundle is illustrated in FIG. 1. A target bundle after heating is illustrated in its crucible in FIG. 2. A target bundle 20 is placed in a crucible 22 that holds it and encloses the bundle laterally, the top of the crucible is covered with a perforated plug 24 and has an integral hook 26. Crucible 22 is lowered into a retort 34 by a lid 36 that seals against a top flange 38 of retort 34. Retort 34 is positioned in a furnace 50 having electric resistance heaters 52 inside its wall 54. An inlet 56 and an exit 58 allow the circulation of coolant to prevent the shell 60 of the furnace from overheating. An off-gas pipe 62 allows tritium to be drawn from the interior of retort 34.

After heating, bundle 20 occupies a much smaller volume than before heating, as depicted in FIG. 2 where a melted bundle 70 is shown in a crucible 72. The melted bundle, slumped to the bottom of the crucible, is disposed of still in the crucible. Although gases from the furnace are drawn off during heating, opening the furnace causes some tritium to escape to the environment.

The current furnace, therefore, is unsatisfactory because it allows too much tritium to escape. Furthermore, the melted bundle comprises only about one tenth of the volume of the crucible. Thus, a substantial fraction of the interior of the crucible, as sent to a waste repository, is empty space.

SUMMARY OF THE INVENTION

According to its major aspects and broadly stated, the present invention is a crucible and sleeve assembly for holding and laterally enclosing an object, such as a target bundle, during transport to and from an inverted furnace where the object is heated to extract recoverable gases. When the object is heated, it gives off gases and vapors of radioactive materials that are drawn from the furnace interior through a trap filled with metal shavings. The hot vapors of radioactive materials condense on the shavings. Gases passing through the trap are collected in tanks downstream as the product.

After the object is heated, it occupies less volume than before it is heated. The crucible is sized to hold and laterally enclose the object after it is heated so that, when a lid is sealed to it, the object is fully enclosed and can be transferred to a disposal or storage facility, the sealed crucible have substantially no empty space within. The crucible and sleeve assembly, on the other hand, is dimensioned to hold and laterally enclose the object before it is heated.

Several components of the invention individually and in cooperation act to prevent the loss of gases to the environment. The furnace is inverted so that gases lighter than air tend to remain in the furnace when it is opened to remove the object. The portion of the furnace that includes the opening is housed within a containment. Airlocks prevent contamination of the atmosphere of the containment when the object is introduced into or taken from the containment. Finally, strippers remove gases from the containment atmosphere that have escaped from the inverted furnace.

The crucible and sleeve assembly is an important feature of the present invention. The two cooperate to securely hold and laterally enclose the object before it is heated. Although a single container can serve the same function, being able to separate the sleeve from the crucible after the object has been heated and its volume is reduced to the preselected dimension of the crucible alone results in a substantial reduction in the volume of the material actually disposed of and enables the reuse of the sleeve.

The crucible and sleeve fit together easily and securely so that full lateral support without leakage is provided. Both have flanges that engage each other, and the sleeve has a skirt that depends from the flange into the crucible.

The inverted furnace is another important feature of the present invention. By inverting the furnace, the prevention of the escape of the gases given off as a result of heating, such as tritium when a nuclear target bundle is heated, is substantially simplified.

The trap of the present invention is another important feature. The trap contains metal shavings on which the radioactive vapors condense, thus simplifying recovery of radioactive vapors that should not be vented to the atmosphere.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a partially schematic, partially cross sectional view of an apparatus according to a preferred embodiment of the present invention showing the steps of loading a bundle into a furnace; and FIG. 4 is a partially schematic, partially cross sectional view of an apparatus according to a preferred embodiment of the present invention showing the steps of unloading the heated bundle from the furnace.

DETAILED DESCRIPTION OF A PREFERRED EMBODIMENT

Figure 1:
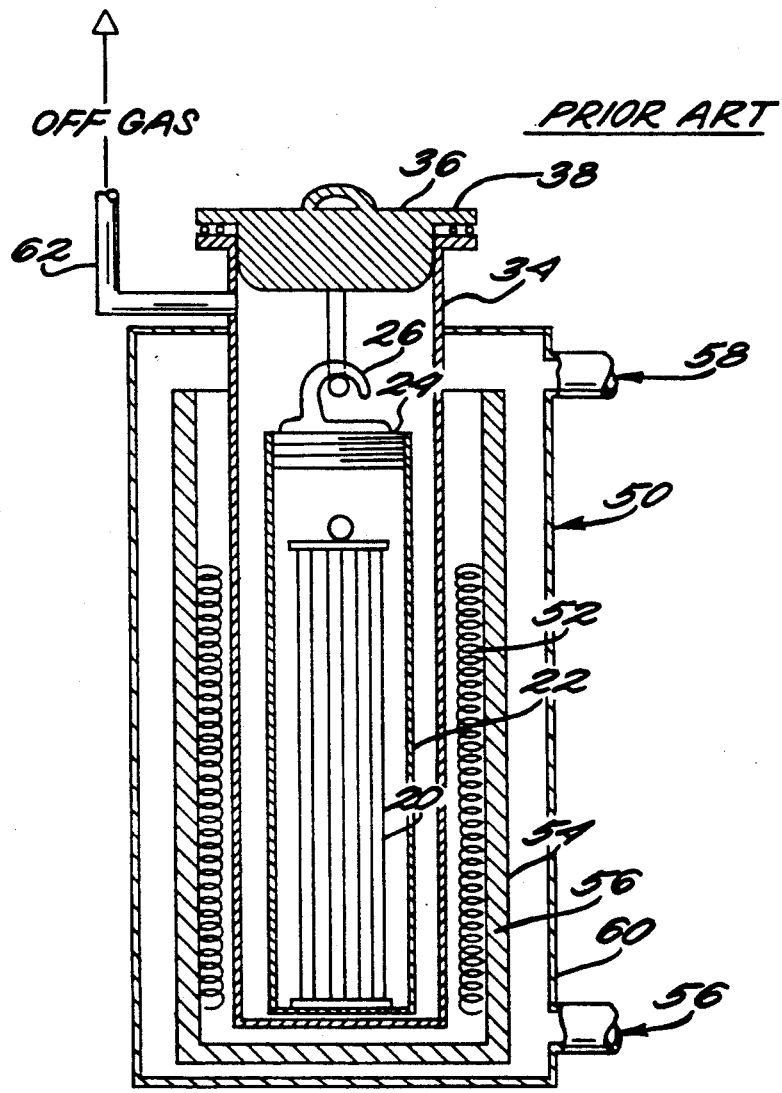
FIG. 1 is a side, cross sectional view of a furnace having a crucible with a target bundle therein according to the prior art.
Figure 2:
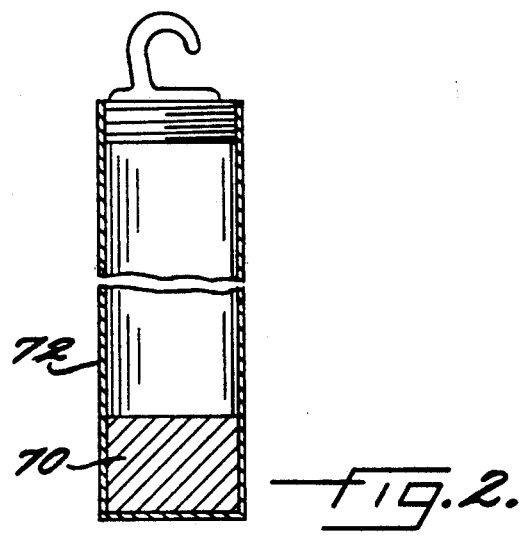
FIG. 2 is a side, cross sectional, view of a prior art crucible with the target bundle after heating in a furnace.

The loading process is illustrated in FIG. 3. The apparatus comprises a furnace 70, a portion of which is inside a containment 72. Furnace 70 has sides 74 and a top 76 that define an interior. Opposing top 76 is an opening 78. At least a portion of furnace 70 is inside containment 72, the portion that includes opening 78. The remainder of furnace 70 may be outside containment 72.

A target bundle 90 is transferred to containment 72 on a shipping cart 92 and into containment through a first air lock. An air lock, as is well known, is a passageway with at least two doors. With an inner door closed and sealed, an outer door is opened to admit the up-ended bundle 90, which is moved toward the inner door. The outer door is closed and the air inside the airlock can be exchanged to avoid the escape of gas from inside containment 72 or the introduction of contaminants to containment 72. The inner door can then be opened and bundle 90 brought into the interior of containment 72. Bundle 90 is lowered into sleeve 110 and crucible 94.

Beforehand, a crucible 94 is transferred into containment 72, also through an airlock. Crucible 94 has a bottom 100, sides 102 and an interior 106 sufficient in its interior volume to hold and enclose laterally the residue of a heated target bundle 90. Sides 102 have a flange 104. By "enclosing laterally", it is meant that the sides of bundle 90 are covered but not necessarily any of the top of the bundle 90. A sleeve 110, which was depending from a pulley (FIG. 4), is lowered onto crucible 94. Sleeve 110 is essentially a hollow cylinder having a flange 112 and a skirt 114 depending from flange 112. Skirt 114 is dimensioned to fit just within sides 102 of crucible 94. Flange 112 engages flange 104 to provide good contact between sleeve 110 and crucible 94.

The combined, internal volume of sleeve 110 seated on crucible 94 is sufficient to hold and laterally enclose bundle 90. Bundle 90 is then transferred to a position just below furnace 70 and on a spacer 120. Spacer 120 is on a lid 122 which is in turn on a lift 124. Lift 124 lifts bundle 90 up and into furnace 70 through opening 78 until lid 122 engages a flange 126 on furnace 70. At least one gasket 130 assures an airtight seal of furnace opening 78.

Furnace 70 is heated by electrical resistance heaters 132 along its upper portion 134. Its lower portion 136, below the fully seated bundle 90, is not heated. Spacer 120 assures that crucible 94 and sleeve 110 are in upper portion 134.

Once lifted to the proper elevation, with lid 122 engaging flange 126, lid 122 is tightened to seal furnace 70 and checked for leaks. Heaters 132 are then activated and heat the bundle in steps to approximately at least 660° C. (the melting point of aluminum). The tritium is extracted under a partial vacuum. Only the upper part of the furnace is heated in order to protect the seal of the flange-to-lid interface.

At the top of furnace 70 is a gas outlet line 140. A trap 142 in gas outlet line 140 is filled with metal shavings 144, comprising preferably copper or steel. During the tritium extraction period, metal vapor, which is radioactive, generated by heating bundle 90, is captured on the shavings 144 and separated from the tritium. Trap 142 is removable and may be replaced as conditions warrant.

During the final heating period when the temperature is above about 600° C., furnace 70 is filled with an atmosphere of a non-reactive gas such as argon or nitrogen, to minimize the vaporization of radioactive zinc and lithium. To prevent deposition of zinc and lithium, the lower part of the furnace can be purged by a slowly flowing, inert gas stream through purge gas line 146. If deposition of these elements does occur, the deposits can be periodically removed by scraping.

Most of furnace 70 is outside the controlled atmosphere of containment 72. This positioning facilitates cooling of furnace 70 and avoids heat build up inside containment 72. When furnace 70 is opened to remove or insert crucible 94, only controlled, dry gas can enter. Tritium, being a gas lighter than air tends to remain in the inverted furnace. If, however, some tritium escaped into the facility, strippers 148 are able to recover it.

The unloading process, illustrated in FIG. 4, is essentially the reverse of the loading process. With lift 124 in position just below but engaging lid 122, the connections between lid 122 and flange 126 are broken and bundle 90 is lowered from furnace 70. Bundle 90 will have melted to just fill only crucible 94. After being moved by rollers to one side, sleeve 110 is lifted free of crucible 94 so that it can be used for the next bundle. Crucible 94 is immediately covered and transferred outside of containment 72, again via an air-lock where it may be stacked on top of other crucibles in a larger, single container 150 for shipment to a disposal facility.

Furnace 70 and crucible 94 are preferably made of stainless steel.

It will be apparent to those skilled in the art that many changes and substitutions can be made to the preferred embodiment herein described without departing from the spirit and scope of the present invention as defined by the appended claims.

What is claimed is:

1. An apparatus for holding and laterally enclosing an object during transporting to and from a furnace and heating in said furnace, said object occupying a smaller volume after being heated than before being heated, said apparatus comprising:

a crucible having an internal volume at least equal to the volume of said object after being heated; and a sleeve removably engaging said crucible, said crucible and said sleeve, when engaged, having an internal volume at least equal to the volume of said object before heating so that said sleeve and said crucible hold and laterally enclose said object before heating but said sleeve can be removed from engagement with said crucible after said object has been heated, said object then being held and completely laterally enclosed only by said crucible.

2. The apparatus as recited in claim 1, wherein said crucible has a bottom and sides and said sleeve has a skirt depending therefrom, said skirt fitting within the sides of said crucible.

3. The apparatus as recited in claim 1, wherein said crucible has a flange and said sleeve has a flange, said flange of said crucible engaging said flange of said sleeve.

4. An apparatus for use in heating an object, said apparatus comprising:
   a furnace having sides and a top, said top and sides defining an interior, and an opening formed in said furnace opposite said top;
   means for holding and enclosing said object when said object is moved to and from said surface and is being heated within said furnace, said holding and closing means entering said furnace through said opening,
   wherein said holding and enclosing means has
      a crucible having an internal volume at least equal to the volume of said object after being heated,
      a sleeve removably engaging said crucible,
      said crucible and said sleeve, when engaged, having an internal volume at least equal to the volume of said object before heating so that said sleeve and said crucible hold and laterally enclose said object before heating but said sleeve can be removed from engagement with said crucible after said object has been heated, said object then being held and completely laterally enclosed only by said crucible; and
   means formed in said furnace and in communication with said interior of said furnace for drawing gases and vapors from said interior.

5. The apparatus as recited in claim 4, further comprising a trap positioned in said drawing means, said trap containing means for condensing at least a portion of said vapors drawn from said interior of said furnace.

6. The apparatus as recited in claim 4, further comprising means in spaced relation to said opening of said furnace for lifting said holding and enclosing means into said furnace and for closing said opening of said furnace.

7. The apparatus as recited in claim 4, further comprising means for recovering gases that escape from said opening of said furnace.

8. The apparatus as recited in claim 4, further comprising means for controlling the atmosphere proximate to said furnace.

9. The apparatus as recited in claim 4, further comprising:
   a containment defining an interior space, said containment including at least a portion of said furnace within said space, said portion including said opening;
   means carried by said containment for controlling the atmosphere proximate to said furnace; and
   means carried by said containment for recovering gases that escape from said opening of said furnace.

10. The apparatus as recited in claim 9, further comprising a trap positioned in said drawing means, said trap containing means for condensing at least a portion of said vapors drawn from said interior of said furnace.

11. The apparatus as recited in claim 9, further comprising means in spaced relation to said opening of said furnace and in said containment for lifting said holding and enclosing means into said interior and for closing said opening of said furnace.

12. A method for processing an object for disposal, said object generating recoverable gases when heated and occupying a smaller volume after being heated than before being heated, said method comprising the steps of:
   lowering a sleeve onto a crucible to form a sleeve/crucible assembly, said sleeve/crucible dimensioned to enclose laterally said object within said sleeve/crucible after said object is placed in said sleeve/crucible;
   placing said object in said sleeve/crucible, said crucible dimensioned to hold and laterally enclose said object after said object has been heated;
   placing said enclosed object into a furnace;
   sealing said furnace;
   heating said object;
   extracting said gases from said furnace;
   opening said furnace;
   removing said object from said furnace;
   removing said sleeve from said crucible; and
   covering said crucible.

13. The method as recited in claim 12, wherein said furnace has sides and a top, said sides and top cooperating to define an interior of said furnace, said furnace having an opening opposing said top, said object being placed into said furnace by lifting said object into said furnace through said opening.

14. The method as recited in claim 12, further comprising the step of disposing said covered crucible.

15. The method as recited in claim 12, further comprising the step of condensing at least a portion of said extracted vapors on metal shavings.

16. The method as recited in claim 12, wherein at least a portion of said furnace is in a containment having an airlock and said method further comprises the step of moving said object in to said containment through said airlock.

17. The method as recited in claim 16, wherein said method further comprises the step of stripping any gases that escape from said furnace from the atmosphere in said containment.

18. The method as recited in claim 16, wherein said method further comprises the steps of:
   purging the air in said interior of said furnace after said furnace is sealed; and
   filling said interior of said furnace with a non-reactive gas.

* * * * *